United States Patent
Eklöf et al.

(10) Patent No.: US 11,272,388 B2
(45) Date of Patent: Mar. 8, 2022

(54) TRANSFER OF MEASUREMENT CONFIGURATION INFORMATION IN WIRELESS COMMUNICATION NETWORKS

(71) Applicant: TELEFONAKTIEBOLAGET LM ERICSSON (PUBL), Stockholm (SE)

(72) Inventors: Cecilia Eklöf, Täby (SE); Gunnar Heikkilä, Gammelstad (SE); Waikwok Kwong, Solna (SE); Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/624,635

(22) PCT Filed: Jul. 9, 2018

(86) PCT No.: PCT/IB2018/055049
§ 371 (c)(1),
(2) Date: Dec. 19, 2019

(87) PCT Pub. No.: WO2019/008559
PCT Pub. Date: Jan. 10, 2019

(65) Prior Publication Data
US 2020/0145865 A1      May 7, 2020

Related U.S. Application Data

(60) Provisional application No. 62/529,691, filed on Jul. 7, 2017.

(51) Int. Cl.
*H04W 4/00*       (2018.01)
*H04W 24/10*      (2009.01)
(Continued)

(52) U.S. Cl.
CPC .......... *H04W 24/10* (2013.01); *H04W 24/08* (2013.01); *H04W 36/14* (2013.01); *H04W 64/003* (2013.01)

(58) Field of Classification Search
CPC ..... H04W 24/10; H04W 24/08; H04W 36/14; H04W 64/003
(Continued)

(56) References Cited

U.S. PATENT DOCUMENTS 9,369,960 B2    6/2016  Lee et al.
2009/0227251 A1*  9/2009  Lei ..................... H04L 41/5054
                                                    455/425

(Continued)

FOREIGN PATENT DOCUMENTS

EP          2692167 A1     2/2014

OTHER PUBLICATIONS

International Search Report and Written Opinion dated Sep. 25, 2018 for International Application No. PCT/IB2018/055049, 12 pages.

(Continued)

*Primary Examiner* — Marcos Batista
(74) *Attorney, Agent, or Firm* — Sage Patent Group

(57) ABSTRACT

Methods and related user equipment are described in which the UE receives a measurement configuration message via a radio network node, the measurement configuration message comprising location information associated with a measurement configuration file, and in which the UE retrieves the measurement configuration file from a server using the received location information.

16 Claims, 6 Drawing Sheets

(51) Int. Cl.
*H04W 24/08* (2009.01)
*H04W 36/14* (2009.01)
*H04W 64/00* (2009.01)

(58) Field of Classification Search
USPC .......................................... 370/329; 455/412
See application file for complete search history.

(56) References Cited

U.S. PATENT DOCUMENTS

2013/0303203 A1* 11/2013 Wang .................... H04W 68/00
455/458
2015/0319795 A1* 11/2015 Kim ...................... H04W 76/12
370/329

OTHER PUBLICATIONS

International Preliminary Report on Patentability dated Jul. 18, 2019 for International Application No. PCT/IB2018/055049, 14 pages.
Huawei Technoligies Co Ltd et al., "Discussion on Maximum Size of the Containers", 3GPP TSG SA WG4 Meeting #92, S4-170028, Tallinn, Estonia, Jan. 23-27, 2017, 4 pages.
Ericsson LM, "Correction for QoE Measurement Collection", 3GPP TSG-SA4 Meeting #93, S4-170454 revision of S4-170401, Busan, Republic of Korea, Apr. 24-28, 2017, 4 pages.

* cited by examiner

TRANSFER OF MEASUREMENT CONFIGURATION INFORMATION IN WIRELESS COMMUNICATION NETWORKS

RELATED APPLICATIONS

The present application claims the benefits of priority of U.S. Provisional Patent Application No. 62/529,691, entitled "TRANSFER OF MEASUREMENT CONFIGURATION INFORMATION IN WIRELESS COMMUNICATION NETWORKS", and filed at the United States Patent and Trademark Office on Jul. 7, 2017, the content of which is incorporated herein by reference.

TECHNICAL FIELD

The present description generally relates to wireless communications and wireless communication networks, and more particularly relates to transfer of measurement configuration information in wireless communication networks.

INTRODUCTION

In 3GPP release 14, there is a work item for "Quality of Experience (QoE) Measurement Collection" for UMTS. A corresponding work item has also been approved for LTE in release 15 and later it will also applicable for NR. The purpose of the work item is to start measurements in the UE to collect information about the quality of streaming services used in the UE. The streaming service is typically a $3^{rd}$ party streaming application on top of a packet-switched interactive radio access bearer (i.e., a packet-switched radio bearer) defined in the radio access network (RAN). The purpose of the measurement collection is to be able to improve the quality of the streaming service.

The measurements may be initiated towards the RAN directly from an operation and management (O&M) node in a generic way for a group of user equipments (UEs). The measurements may also be initiated towards the RAN by receiving a "trace request" from the core network. The configuration of the measurements includes the measurement details, which are encapsulated in a container or file that is transparent to the RAN, and the address to the trace collection entity (TCE) to which the collected measurements should be sent. The configuration information typically comprises a dynamic adaptive streaming over HTTP (DASH) file specifying how the data are to be collected. The RAN then starts the measurements in the UE by sending the configuration information transparently to the UE. The end-to-end signaling flow for configuring and reporting the measurements is shown in FIG. 1.

The existing UMTS solution is specified in terms of existing RRC measurement procedures. The configuration information is carried in a MEASUREMENT CONTROL message in the form of a transparent container. The measurement results are carried in a MEASUREMENT REPORT message, again in the form of a transparent container. The RAN is responsible for relaying the results transparently to the trace collection entity.

When initiated by the core network, the measurement is directed towards a specific UE. The "trace request" referred to above is realized, in UMTS, as the RANAP message CN INVOKE TRACE, which carries the configuration information with the measurement details and the IP address to the trace collection entity to which the collected measurements should be sent. Similar mechanism exists in LTE S1AP in the TRACE START message. A similar mechanism may also be defined for NR as well.

However, the QoE configuration messages can be relatively large, and due to some issues with transferring large files in RRC messages, a user plane solution is being discussed in LTE and if agreed it may also be ported to UMTS. It is however still important that any user plane solution can be activated in the same way as other RAN-controlled measurements, as described above, so that, for instance, geographical filtering and other possible RAN criteria can be observed.

SUMMARY

In the current solution, the RAN sends the measurement configuration file to the UE when configuring QoE measurements. When the UE enters the idle mode, the configuration is cleared and when the UE enters the connected mode again, the measurement configuration file is sent again. As the measurement configuration file is quite large, sending the same file multiple times may consume unnecessary resources. It is also likely that the measurement configuration file has not changed since it was last sent, but since it is cleared in the UE, there is a need to resend this information.

The measurement configuration file contains information on how the UE should perform certain measurements when and/or if the UE starts a streaming service. However, many UEs may not use streaming services (or other application layer services) at all during a long time, and thus sending the measurement configuration file to these UEs may also waste resources.

Instead of using only the control plane for sending the configuration, a combined control-plane/user-plane solution is proposed.

When an O&M node or a core network node initiates a new QoE configuration file, the configuration file is first stored in a server such as an Application Measurements Server (AMS) node in the network, typically with a unique name. Then only the address to the configuration file is sent down to the RAN, which sends it to the UE. This address is very short. As such, transmitting the address every time the UE goes from idle mode to connected mode consumes less resources than transmitting the whole configuration file.

When the UE gets the address from the RAN (over the control plane), it uses the address to fetch the configuration file (e.g. via HTTP) from the AMS over the user plane. Once fetched, the configuration file and/or the configuration is to be kept in the UE for at least a certain amount of time and not cleared immediately when the UE transitions to idle mode or when the starting of new measurements is stopped when the UE leaves the measurement area. To avoid unnecessary fetches, the UE may first compare the address with any still valid/existing address it previously received and used when it last fetched the configuration file, and only fetches the configuration file if these addresses are not equal (i.e., are different).

Optionally, even if the addresses do not match, the UE may delay fetching the configuration file until a streaming session is started, to avoid using unnecessary capacity. In this case, the UE does not fetch the configuration file until the application layer asks for it.

Generally, the address sent down would typically consist of a uniform resource locator (URL) pointing to the configuration file on the AMS, together with an access point name (APN) which the UE can use to connect to the AMS.

A specific APN is needed in the case that the AMS is not accessible from the Internet. Instead of a complete link, an identifier could also be sent.

The solution applies to UTRAN, E-UTRAN and NR.

According to one aspect, some embodiments include a method performed by user equipment, UE. The method generally comprises receiving a measurement configuration message via a radio network node, the measurement configuration message comprising location information associated with a measurement configuration file, and retrieving the measurement configuration file from a server using the received location information.

In some embodiments, receiving the measurement configuration message may be performed over a control plane while retrieving the measurement configuration file may be performed over a user plane.

In some embodiments, the method may comprise, or further comprise, determining a need for retrieving the measurement configuration file from the server prior to retrieving the measurement configuration file from the server using the location information. In such embodiments, determining the need for retrieving the measurement configuration file from the server may comprise determining that the received location information is different from previously received location information, and/or determining that an application layer service requiring measurement is about to start or has already started.

In some embodiments, retrieving the measurement configuration file from the server using the received location information may comprise transmitting a request for the measurement configuration file to the server, and receiving the measurement configuration file from the server.

In some embodiments, the measurement configuration file and the corresponding location information contained in the measurement configuration message are stored at the UE for a predetermined amount of time.

In some embodiments, the location information associated with the measurement configuration file may comprise a uniform resource locator (URL), and/or an access point name (APN), and/or an identifier.

According to another aspect, some embodiments include a UE configured, or operable, to perform one or more UE functionalities (e.g. steps, actions, etc.) as described herein.

In some embodiments, the UE may comprise one or more communication interfaces configured to communicate with one or more other UEs, with one or more radio network nodes and/or with one or more network nodes (e.g., O&M nodes, core network nodes), and processing circuitry operatively connected to the communication interface, the processing circuitry being configured to perform one or more UE functionalities as described herein. In some embodiments, the processing circuitry may comprise at least one processor and at least one memory storing instructions which, upon being executed by the processor, configure the at least one processor to perform one or more UE functionalities as described herein.

In some embodiments, the UE may comprise one or more functional modules configured to perform one or more UE functionalities as described herein.

According to another aspect, some embodiments include a computer program product comprising a non-transitory computer-readable medium storing instructions (e.g., computer readable program code) which, upon being executed by processing circuitry (e.g., a processor) of the UE, configure the processing circuitry to perform one or more UE functionalities as described herein.

Some embodiments may enable the transmission of location information associated with a measurement configuration file over the control plane, while the bulk of the measurement configuration file is fetched or otherwise retrieved via the user plane. In some embodiments, the measurement configuration file does not have to be transferred multiple times if the measurement configuration file does not change. In some embodiments, the measurement configuration file does not have to be transferred at all if the UE never uses streaming services.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 1:
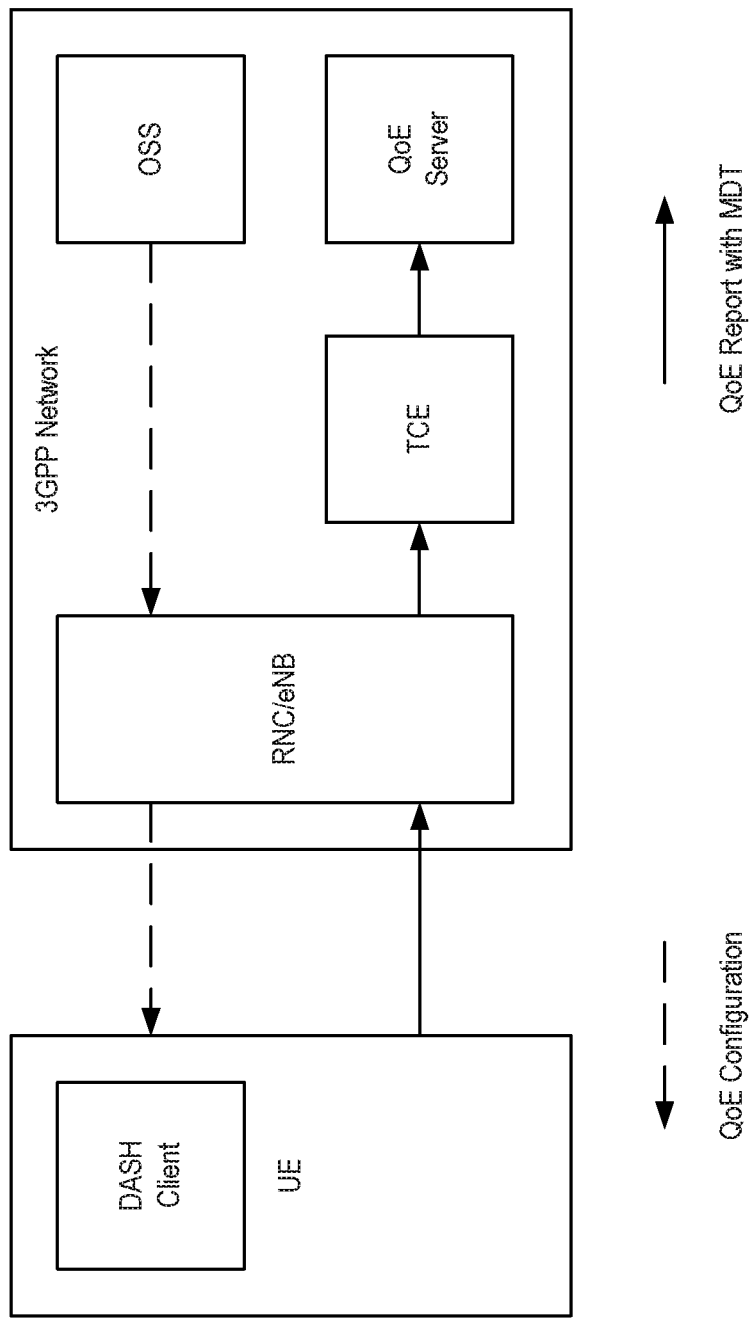
FIG. 1 is a schematic diagram of an example end-to-end flow for quality of experience, QoE, measurement collection in accordance with some embodiments.
Figure 2:
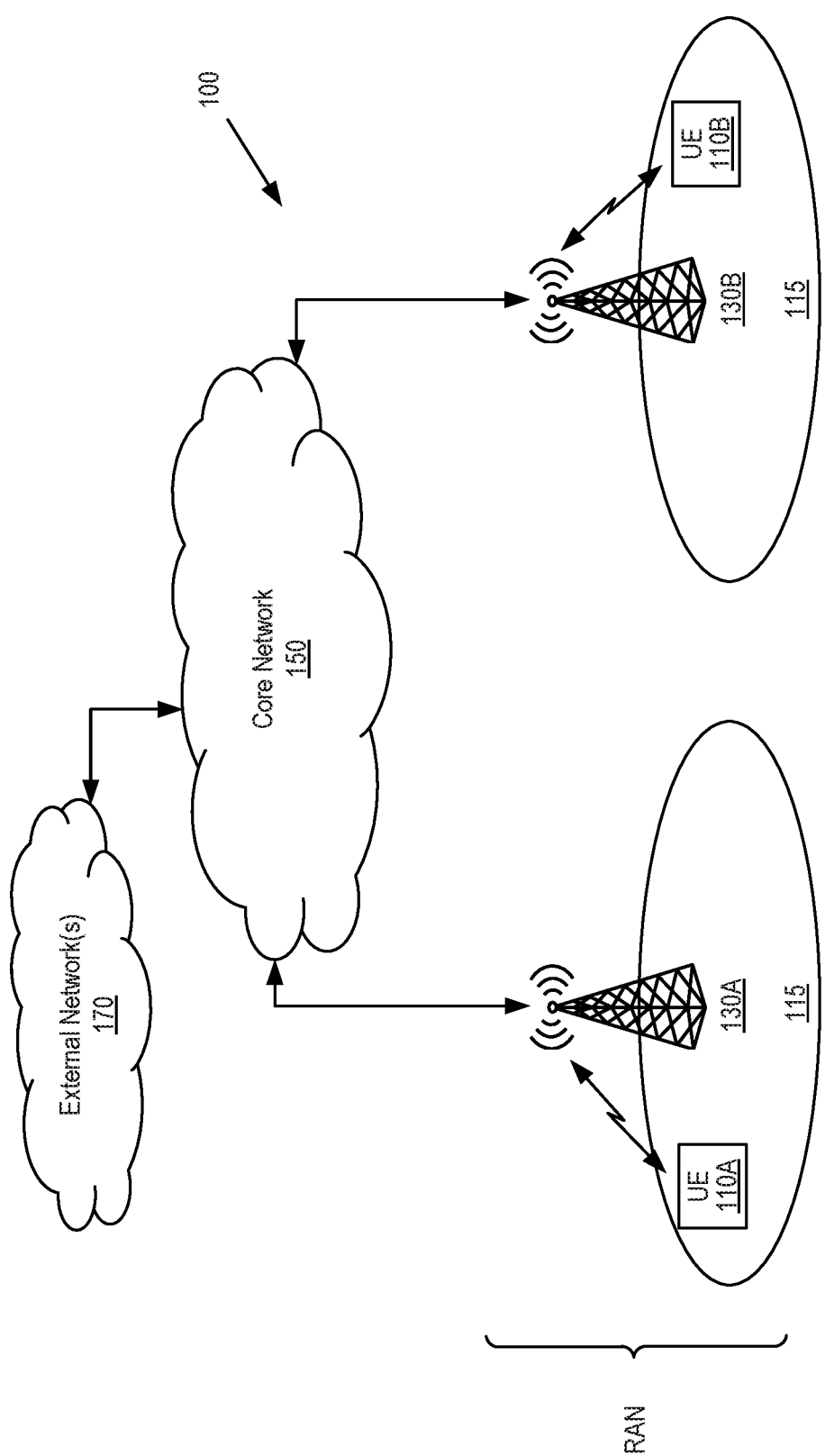
FIG. 2 is a schematic diagram of an example communication network in accordance with some embodiments.

FIG. 2 illustrates an example of a wireless network 100 that may be used for wireless communications. Wireless network 100 includes UEs 110A-110B (collectively referred to as UE or UEs 110) and a plurality of radio network nodes 130A-130B (e.g., NB s and/or RNCs in UMTS, eNB s in LTE, gNB s in NR, etc.) (collectively referred to as radio network node or radio network nodes 130) directly or indirectly connected to a core network 150 which may comprise a plurality of core network nodes (e.g., SGSNs and/or GGSNs in UMTS, MMEs, SGWs, and/or PGWs in LTE/EPC, AMFs, SMFs, and/or UPFs in NGC, etc.) (collectively referred to as core network node or core network nodes). The network 100 may use any suitable radio access network (RAN) deployment scenarios, including UMTS Terrestrial Radio Access Network, UTRAN, Evolved UMTS Terrestrial Radio Access Network, EUTRAN, and Next Generation Radio Access Network, NG-RAN. UEs 110 within coverage areas 115 may each be capable of communicating directly with radio network nodes 130 over a wireless interface. In certain embodiments, UEs may also be capable of communicating with each other via device-to-device (D2D) communication.

As an example, UE 110A may communicate with radio network node 130A over a wireless interface. That is, UE 110A may transmit wireless signals to and/or receive wireless signals from radio network node 130A. The wireless signals may contain voice traffic, data traffic, control signals, and/or any other suitable information. In some embodiments, an area of wireless signal coverage associated with a radio network node 130 may be referred to as a cell.

Broadly, when an operation and management (O&M) node or a core network node initiates a new QoE measurement configuration file, the measurement configuration file (which may also be referred to as measurement configuration container) containing the QoE measurement parameters is stored in a file server such as an Application Measurements Server (AMS) node in the network (e.g., external network 170). The file is stored with a unique identifier. The address of the measurement configuration file is then sent to the UE, via the radio access network, when QoE measurements are initiated. The radio access network may send the address to the UE in an RRC reconfiguration message, possibly via a RRCConnectionReconfiguration message in a radio access network operating according to the LTE standards, or via a RRC Measurement Control message in a radio access network operating according to the UMTS standards. The address is significantly smaller in size compared to the size of the measurement configuration file. As such, sending the address every time QoE measurements are initiated or every time the UE goes from idle mode to connected mode consumes less resources than sending the full measurement configuration file.

Currently, only QoE measurements for streaming services have been included in the specifications, but in later releases, other type of application layer measurements may be added. Thus, while the description mostly describes QoE-related measurements, the concept as such is valid for any type of application layer measurements.

Figure 3:
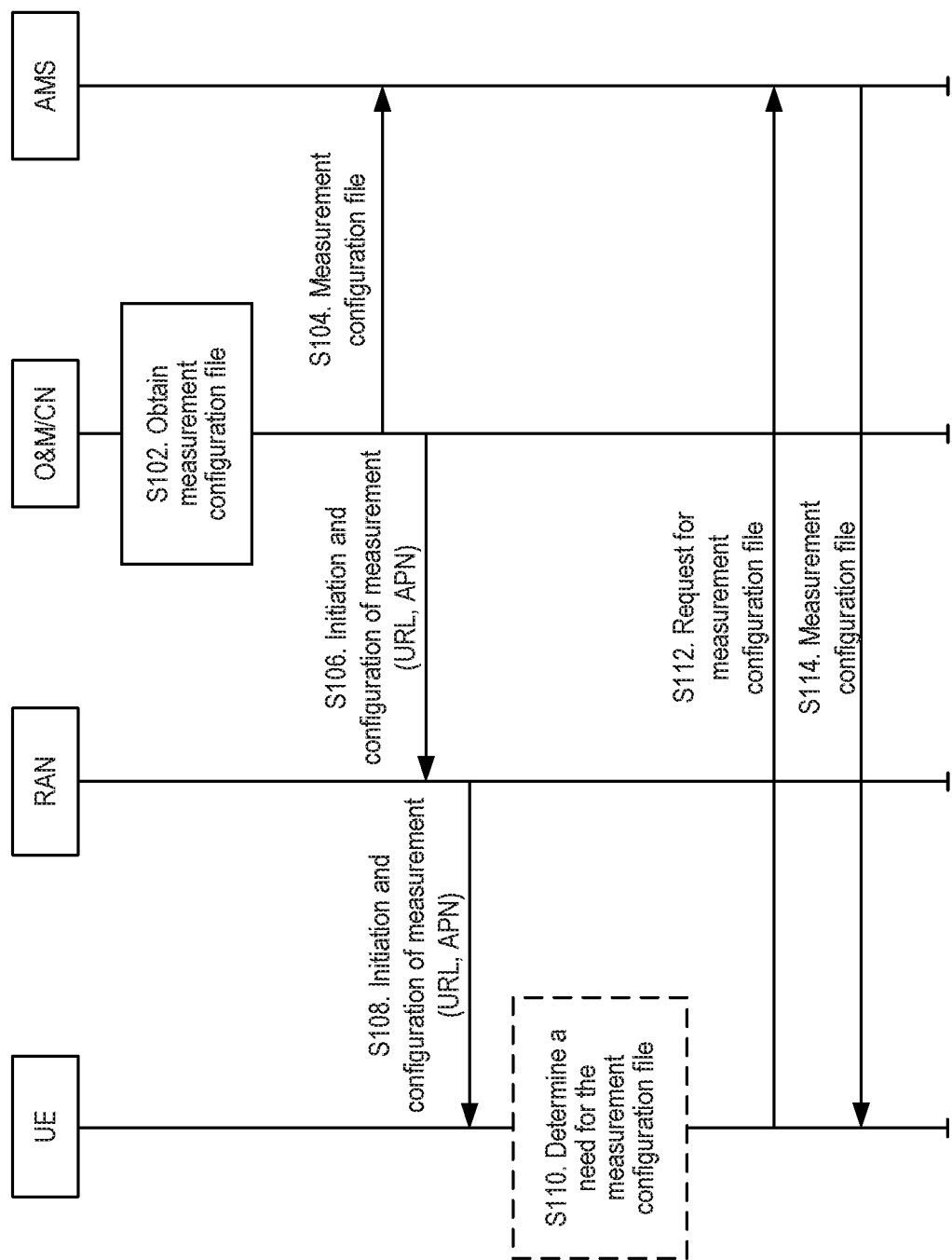
FIG. 3 is a signaling diagram in accordance with some embodiments.

Referring to FIG. 3, a high-level signaling and operating diagram according to some embodiments is illustrated. As shown, a node in a core network 150, e.g., an O&M node or another core network node, obtains a (new) QoE measurement configuration file (action S102). The core network node may generate the file itself or may obtain the file from another node. Regardless of how the core network node obtains the measurement configuration file, the core network node then stores the measurement configuration file on a file server (action S104). In some embodiments, the file server may be an Application Measurement Server (AMS). The core network node then sends location information (e.g., a network address) associated with the measurement configuration file to a radio network node (e.g., a RNC in a UMTS network, an eNB in a LTE network, etc.) (action S106). The radio network node than forwards the location information to the UE (action S108).

In some embodiments, the location information may be transmitted as part of a measurement configuration message (e.g, a RRCConnectionReconfiguration message in LTE, a RRC Measurement Control message in UMTS).

In some embodiments, the location information transmitted to the UE may comprise a Uniform Resource Locator, URL, pointing to the measurement configuration file on the server, possibly with an Access Point Name, APN, which the UE may need to use to connect to the server. A specific APN may be needed if the server is not accessible from the Internet.

Some examples of how the location information are presented below:

Server: 10.0.0.2/201706301.cfg
APN: 10.0.0.1
or:
Server: ams.telia.com/qoeconfigurationfile1.cfg
APN: apn.telia.com Once the UE received the location information, the UE uses the received location information to retrieve the measurement configuration file (e.g., via HTTP) from the server (actions S112 and S114). The retrieval of the configuration file container may be done over the user plane while the reception of the location information may be done over the control plane.

In some embodiments, the UE may keep the configuration information for at least a certain amount of time and may not clear the configuration information immediately when the UE transitions from connected mode to idle mode or when the starting of new measurements is stopped when the UE leaves the measurement area.

To avoid the UE unnecessary retrieving the measurement configuration file, the UE may, in some embodiments, determine a need to retrieve the measurement configuration file prior to retrieving it. In some embodiments, determining a need to retrieve the measurement configuration file may comprise determining that the received location information is different from previously received location information. For instance, the UE may compare the received location information with the location information it used when it last retrieved the measurement configuration file. The UE determines a need to retrieve the measurement configuration file only if the received location information and the previously received and possibly used location information are different.

In some embodiments, the location information may comprise an address and a specific identifier (ID) identifying the file. The first time the location information is transmitted to the UE, both the address and the ID may be transmitted as part of the location information. However, subsequent transmissions of the location information may only comprise the ID and the UE can use the previously received address to fetch the identified file.

Figure 4:
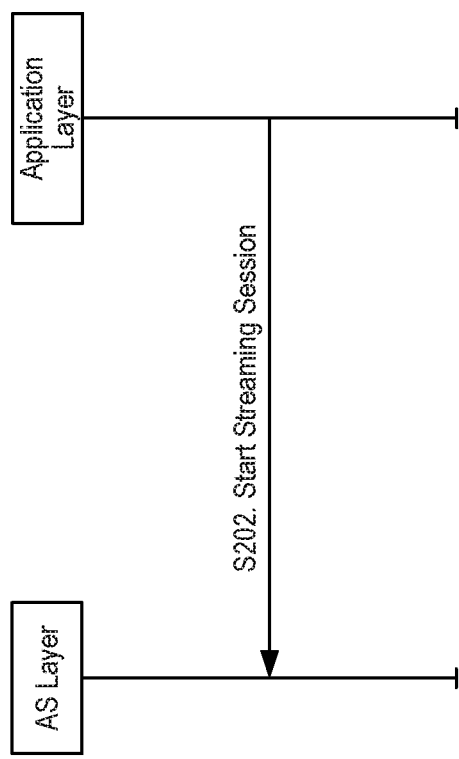
FIG. 4 is another signaling diagram in accordance with some embodiments.

In some embodiments, determining a need to retrieve the measurement configuration file may additionally or alternatively comprise determining that an application layer service (e.g., a streaming service) for which QoE measurements are required is about to start or has already started. For instance, if QoE measurements are required for streaming services, the UE may wait for such a service to be started to retrieve the measurement configuration file. Understandably, waiting for the start, or imminent start, of an application layer service for which QoE measurements are required to retrieve the measurement configuration file may avoid wasting resource for transmitting the measurement configuration file when the UE rarely, or even never, uses application layer services for which QoE measurements are required. To allow the UE to retrieve the measurement configuration file only when an application layer service for which QoE measurements are required is about to start or has already started, the layer(s) responsible for retrieving the measurement configuration file need to be informed about the start or imminent start of the application layer service. The indication of the start or imminent start of the application layer service may be sent as an internal message or command within the UE. For instance, as shown in FIG. 4, the application layer responsible for the application layer service for which QoE measurements are required informs the access stratum (AS) layer in the UE that an application layer service, e.g., a streaming session, is starting (action S202).

Understandably, even if the received location information is different from the previously received location information, or if previously received location information is lacking, the UE may delay the retrieval of the measurement configuration file until an application layer service, e.g., a streaming session, is started.

In some embodiments, the configuration of QoE measurements may be done by using RRC messages. In some other embodiments, the configuration may be done using non-access stratum (NAS) messages, that is the location information associated with the measurement configuration file may be sent in a NAS message. In still other embodiments, the location information associated with the measurement configuration file may be indicated to the UE by O&M.

Figure 5:
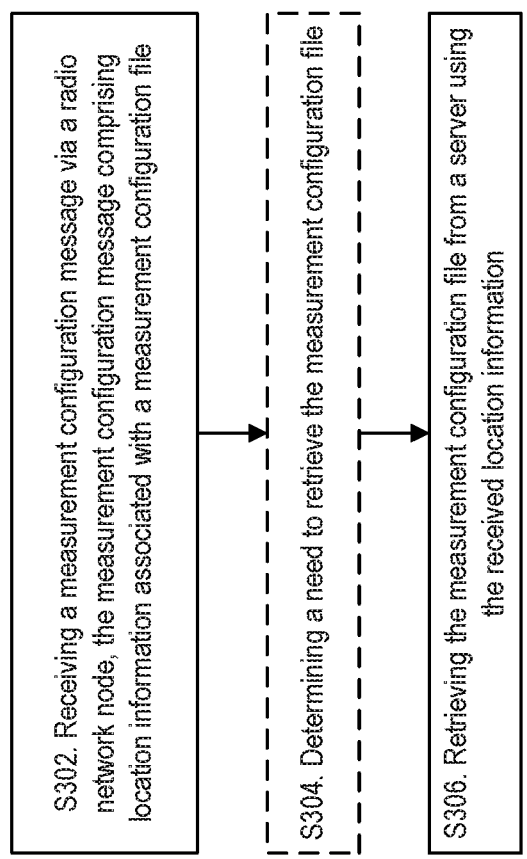
FIG. 5 is a flow chart of operations of a user equipment in accordance with some embodiments.

FIG. 5 is a flow chart that illustrates operations of the UE 110 in accordance with some embodiments. As illustrated, the UE 110 receives a measurement configuration message via a radio network node (e.g., radio network node 130), the measurement configuration message comprising location information associated with a measurement configuration file (action S302). In some embodiments, the received location information may comprise a URL of the measurement configuration file and a APN identifying how to access the server where the file is stored. In some other embodiments, the received location information may comprise an identifier of the measurement configuration file. Such an identifier may allow the UE 110 to determine which file to retrieve and/or on which server to retrieve it. For instance, the identifier may identify the file to retrieve on a pre-configured or previously configured server.

Optionally, the UE 110 determines a need to retrieve the measurement configuration file prior to retrieving the measurement configuration file from the server (action S304). Different needs may cause the UE to retrieve the measurement configuration file. For instance, in some embodiments, the UE may determine a need to retrieve the measurement configuration file when the received location information is different from previously received (and possibly used) location information. Understandably, if the received location information is the same as the one previously received, the UE 110 may refrain from retrieving the measurement configuration file since the measurement configuration file has not changed. In other embodiments, the UE 110 may determine, or further determine, a need to retrieve the measurement configuration file when the UE determines that an application layer service requiring QoE measurements (e.g., a streaming service) is about to start or has already started. In such embodiments, the UE may wait for the start of the application layer service requiring QoE measurements to retrieve the measurement configuration file.

At some point in time after the reception of the measurement configuration message, the UE 110 retrieves the measurement configuration file from the server using the received location information (action S306). In some embodiments, when retrieving the measurement configuration file from the server, the UE 110 may transmit a request for the measurement configuration file to the server, and then receive the measurement configuration file from the server.

Some embodiments of a UE 110 will now be described with respect to FIGS. 6 and 7. Even though the expression User Equipment is used throughout the description, it is to be understood that the expression is used generically. In that sense, other communication standards may use different terminology when describing user equipment. For instance, in addition to User Equipment, 3GPP also used mobile terminal (MT). For its part, 3GPP2 uses the term access terminal (AT) and IEEE 802.11 (also known as WiFi™) uses the term station (STA).

Figure 6:
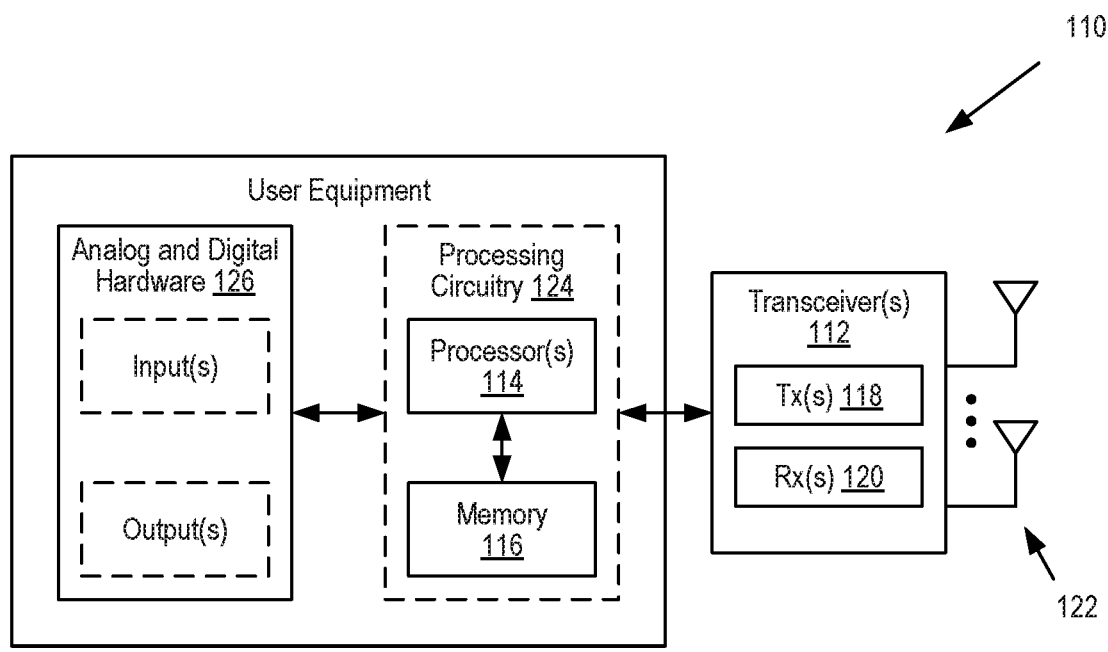
FIG. 6 is a block diagram of a user equipment in accordance with some embodiments.

FIG. 6 is a block diagram of an exemplary UE 110 in accordance with some embodiments. UE 110 includes one or more of a transceiver 112, processor 114, and memory 116. In some embodiments, the transceiver 112 facilitates transmitting wireless signals to and receiving wireless signals from radio network node 130 (e.g., via transmitter(s) (Tx) 118, receiver(s) (Rx) 120 and antenna(s) 122). The processor 114 executes instructions to provide some or all of the functionalities described above as being provided by UE 110, and the memory 116 stores the instructions to be executed by the processor 114. In some embodiments, the processor and the memory form processing circuitry 124.

The processor 114 may include any suitable combination of hardware to execute instructions and manipulate data to perform some or all of the described functions of UE 110, such as the functions of UE 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by a processor 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 114 of UE 110.

Other embodiments of UE 110 may include additional components beyond those shown in FIG. 6 that may be responsible for providing certain aspects of the UE's functionalities, including any of the functionalities described above and/or any additional functionalities (including any functionality necessary to support the solution described above). As just one example, UE 110 may include analog and/or digital hardware 126 such as input devices and circuits and output devices and circuits. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
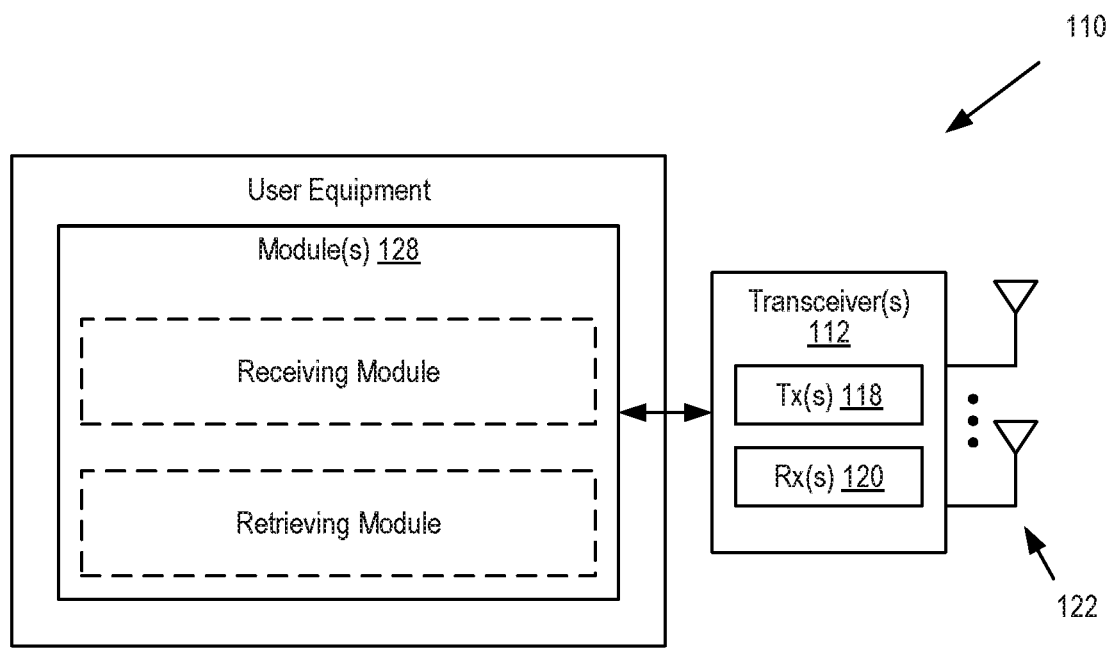
FIG. 7 is another block diagram of a user equipment in accordance with some embodiments.

FIG. 7 is a block diagram of another exemplary UE 110 in accordance with some embodiments. As illustrated, in some embodiments, the UE 110 may comprise a series of modules (or units) 128 configured to implement some or all of the functionalities of the UE 110 described above. More particularly, in some embodiments, the UE 110 may comprise a receiving module configured to receive a measurement configuration message via a radio network node, the measurement configuration message comprising location information associated with a measurement configuration file, and a retrieving module configured to retrieve the measurement configuration file from a server using the received location information.

It will be appreciated that the various modules 128 may be implemented as combination of hardware and/or software, for instance, the processor 114, memory 116 and transceiver(s) 112 of UE 110 shown in FIG. 6. Some embodiments may also include additional modules to support additional and/or optional functionalities.

Some embodiments may be represented as a computer program product comprising a non-transitory machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Abbreviations

The present description may comprise one or more of the following abbreviation:

3GPP Third Generation Partnership Project
AMF Access Management Function
AMS Application Measurements Server
APN Access Point Name
AS Access Stratum
CN Core Network
D2D Device-to-Device
DASH Dynamic Adaptive Streaming over HTTP
DRB Data Radio Bearer
eNB evolved Node B
EPC Evolved Packet Core
E-UTRAN Evolved Universal Terrestrial Radio Access Network
GGSN Gateway GPRS Support Node
gNB Next Generation Node B (a Node B supporting NR)
HSPA High-Speed Packet Access
LTE Long Term Evolution
MDT Minimization of Drive Tests
MME Mobility Management Entity
NAS Non-Access Stratum
NB Node B
NGAP NG Application Protocol
NGC Next Generation Core
NR New Radio
O&M Operation and Maintenance
PGW Packet Data Network Gateway
PS Packet Switched
QoE Quality of Experience
RAB Radio Access Bearer
RAN Radio Access Network
RANAP Radio Access Network Application Part
RNC Radio Network Controller
RRC Radio Resource Control
S1AP S1 Application Protocol
SGSN Serving GPRS Support Node
SGW Serving Gateway
SMF Session Management Function
SRB Signaling Radio Bearer
UE User Equipment
UMTS Universal Mobile Telecommunications System
UPF User Plane Function
URL Uniform Resource Locator
UTRAN Universal Terrestrial Radio Access Network
XML Extensible Markup Language

What is claimed is:

1. A method in a user equipment, UE, the method comprising:
   receiving a measurement configuration message via a radio network node, the measurement configuration message being received over a control plane, the measurement configuration message comprising network location information associated with a measurement configuration file;
   determining a need for retrieving the measurement configuration file from a server; and
   retrieving the measurement configuration file from the server using the received network location information, the measurement configuration file being retrieved over a user plane,
   wherein determining the need comprises determining that an application layer service requiring measurement is about to start or has already started and wherein an access stratum (AS) layer in the UE receives an indication from an application layer that the application layer service is started.

2. The method of claim 1, wherein determining a need for retrieving the measurement configuration file comprises determining that the received network location information is different from previously received network location information.

3. The method of claim 1, wherein retrieving the measurement configuration file from the server using the received network location information comprises transmitting a request for the measurement configuration file to the server and receiving the measurement configuration file from the server.

4. The method of claim 1, wherein the measurement configuration file and the corresponding network location information contained in the measurement configuration message are stored at the UE for a predetermined amount of time.

5. The method of claim 1, wherein the network location information comprises a uniform resource locator, URL, associated with the measurement configuration file.

6. The method of claim 1, wherein the network location information comprises an access point name, APN, associated with the measurement configuration file.

7. The method of claim 1, wherein the network location information comprises an identifier associated with the measurement configuration file.

8. The method of claim 1, wherein the measurement configuration file comprises information regarding measurements to be performed by the UE, when the UE starts a streaming service.

9. A user equipment, UE, adapted to:
receive a measurement configuration message via a radio network node, the measurement configuration message being received over a control plane, the measurement configuration message comprising network location information associated with a measurement configuration file;
determine a need for retrieving the measurement configuration file from a server; and
retrieve the measurement configuration file from the server using the received network location information, the measurement configuration file being retrieved over a user plane,
wherein determining the need comprises determining that an application layer service requiring measurement is about to start or has already started and wherein an access stratum (AS) layer in the UE receives an indication from an application layer that the application layer service is started.

10. The UE of claim 9, further adapted, when determining a need for retrieving the measurement configuration file, to determine that the received network location information is different from previously received network location information.

11. The UE of claim 9, further adapted, when retrieving the measurement configuration file from the server using the received network location information, to transmit a request for the measurement configuration file to the server and to receive the measurement configuration file from the server.

12. The UE of claim 9, wherein the measurement configuration file and the corresponding network location information contained in the measurement configuration message are stored at the UE for a predetermined amount of time.

13. The UE of claim 9, wherein the network location information comprises a uniform resource locator, URL, associated with the measurement configuration file.

14. The UE of claim 9, wherein the network location information comprises an access point name, APN, associated with the measurement configuration file.

15. The UE of claim 9, wherein the network location information comprises an identifier associated with the measurement configuration file.

16. A computer program product comprising a non-transitory computer readable storage medium having computer readable program code embodied in the medium, the computer readable program code comprising:
computer readable program code to receive a measurement configuration message via a radio network node, the measurement configuration message being received over a control plane, the measurement configuration message comprising network location information associated with a measurement configuration file;
determining a need for retrieving the measurement configuration file from a server; and
computer readable program code to retrieve the measurement configuration file from the server using the received network location information, the measurement configuration file being retrieved over a user plane,
wherein determining the need comprises determining that an application layer service requiring measurement is about to start or has already started and wherein an access stratum (AS) layer in the UE receives an indication from an application layer that the application layer service is started.

* * * * *